UNITED STATES PATENT OFFICE 2,009,063

WATER INSOLUBLE AZO-DYESTUFF AND FIBER DYED THEREWITH

Leopold Laska and Arthur Zitscher, Offenbach-on-the-Main, Germany, assignors to General Aniline Works, Inc., New York, N. Y., a corporation of Delaware No Drawing. Application June 22, 1933, Serial No. 677,168. In Germany June 25, 1932

14 Claims. (Cl. 260—76)

The present invention relates to water-insoluble azo-dyestuffs and to fiber dyed therewith.

These dyestuffs contain as typical component once or twice a 1-hydroxy-3,5-diarylamino-benzene of the following general formula:

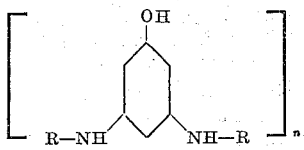

wherein R means a radical of the benzene, naphthalene or quinoline series and $n$ means the number 1 or 2.

In the molecule of the new dyestuffs one or two of the aforesaid hydroxy-diarylamino-benzenes are attached by means of azo groups to a radical of the benzene, naphthalene, diphenyl, anthraquinone or carbazole series.

In consequence of the fact that the 1-hydroxy-3,5-diarylamino-benzenes of the above formula may be once or twice attached by means of azo groups to the aforesaid radicals of the benzene, naphthalene, diphenyl, anthraquinone or carbazole series and that the azo radical may be once or twice attached to the hydroxy-diarylamino-benzene compound according to the combining conditions and the kind of the diazo compound so that practically in most cases mixtures of dyestuffs containing the azo group in para-position and/or ortho-position to the hydroxy group are obtained, a general formula covering all the dyestuffs forming the subject of the present invention cannot be given.

The dyestuffs may be obtained by combining, either in substance, on the fiber or on any of the usual substrata adapted for the production of lakes, a diazo, tetrazo or diazoazo compound of the benzene, naphthalene, diphenyl, anthraquinone or carbazole series with a 1-hydroxy-3,5-diarylamino-benzene of the following general formula

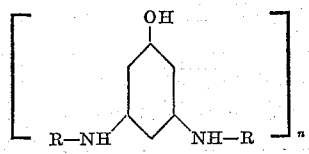

wherein R means a radical of the benzene, naphthalene or quinoline series and $n$ means the number 1 or 2, only such components being used which do not contain any group lending solubility, such as the sulfonic acid or carboxylic acid group.

There are obtained in this manner dyeings the shades of which vary from Bordeaux to brown to black according to the kind of the diazo compounds from monoamines, polyamines or aminoazo compounds.

If produced in substance, the new dyestuffs may be used for the preparation of lakes. They are of particular value for the preparation of ice-colors.

The 1-hydroxy-3,5-diarylamino-benzenes possess surprisingly such a high affinity for the vegetable and animal fiber that the material grounded with these compounds may be developed with diazo compounds without an intermediate drying.

The following examples serve to illustrate the invention, but they are not intended to limit it thereto, the parts being by weight, unless otherwise stated:

(1) Well boiled and dried cotton yarn is impregnated with a solution which contains per liter 5 grams of 1-hydroxy-3,5-diphenylamino-benzene, 10 cc. of caustic soda solution of 34° Bé., 10 cc. of Turkey red oil and 10 grams of sodium chloride, and, after squeezing, it is developed in a solution which contains per liter the diazo compound from 1.62 grams of 1-amino-2,5-dichlorobenzene and which has been neutralized by means of sodium acetate, then the yarn is rinsed and soaped.

A yellow-brown dyeing of very good fastness to washing is obtained.

The dyestuff corresponds to the following formula:

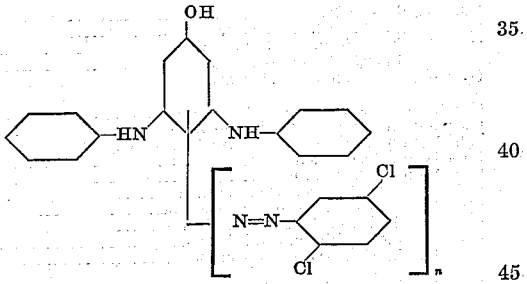

wherein $n$ means the number 1 or 2.

By means of the same diazo compound and 1-hydroxy-3,5-di-(4'-methylphenylamino)-benzene or 1-hydroxy-3,5-di-(2',4'-dimethylphenylamino)-benzene, there are likewise obtained yellow-brown dyeings.

(2) Cotton yarn which has been pretreated in the usual manner, is padded with a solution which contains per liter 10 grams of 1-hydroxy-3,5-di-(4'-methoxyphenylamino)-benzene, 20 cc. of caustic soda solution of 34° Bé., 20 cc. of Turkey red oil and 10 grams of sodium chloride, and, after squeezing, it is developed in a feebly acetic acid diazo solution which contains per liter the diazo compound from 2.54 grams of 1-amino-2-(4'-chlorophenoxy)-5-chlorobenzene, thereupon, it is rinsed and soaped.

An orange-brown dyeing is obtained.

The dyestuff corresponds to the following formula:

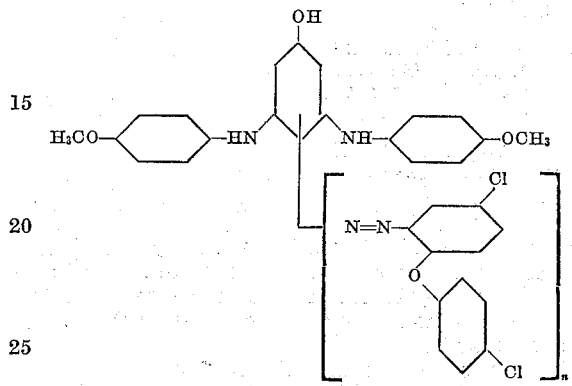

wherein $n$ means the number 1 or 2.

The dyestuff may also be prepared according to the nitrosamine printing process by printing with a mixture prepared from an alkali metal salt of the nitrosamine of 1-amino-2-(4'-chlorophenoxy)-5-chlorobenzene and an alkali metal salt of 1-hydroxy-3,5-di-(4'-methoxyphenylamino)-benzene.

By using the same azo component and 4,4'-diamino-3,3'-dichlorodiphenyl, there is obtained a deep reddish brown, and by means of 4-amino-3,2'-dimethylazo-benzene a brownish garnet is obtained.

If wood is grounded with a solution of 1-hydroxy-3,5-di-(4'-chlorophenylamino)-benzene in a caustic soda solution and developed with the diazo compound prepared from 1-amino-2-phenoxy-5-chlorobenzene, a yellow-brown dyeing is obtained.

(3) 17.25 parts of 1-amino-2-chloro-4-nitrobenzene are diazotized in known manner and the diazo solution is coupled with a solution of 31 parts of 1-hydroxy-3,5-di-(4'-methylphenylamino)-benzene in dilute caustic soda solution to which there have been added the quantity of sodium acetate necessary for binding the excess of mineral acid and 5 parts of Turkey red oil. The precipitated monoazo-dyestuff is filtered with suction and washed well. In order to prepare pigment dyes, the dyestuff is advantageously used in the form of a paste and yields, when mixed with substrata, a brown lake. If dried, the dyestuff forms a dark powder which dissolves in concentrated sulfuric acid to a red solution.

The corresponding disazo dyestuffs is prepared by coupling the diazo compound from 34.5 parts of 1-amino-2-chloro-4-nitrobenzene with the aforesaid quantity of the azo component whereupon dilute caustic soda solution is gradually added, drop by drop, until the reaction is distinctly alkaline. The precipitated dyestuff is filtered with suction and washed well. It forms in the dry state a dark powder which dissolves in concentrated sulfuric acid to a red solution. In order to prepare pigment dyes, it is advantageously used in the form of a paste and, mixed with substrata, it yields a brown lake.

By using other diazo-diazoazo- and tetrazo compounds and other 1-hydroxy-3,5-diarylamino-benzenes, the process may be performed in the same manner.

The following dyestuffs, among others, are capable of production in accordance with this invention:

|     | Diazo compound of— | Combined with— | Shade |
| --- | --- | --- | --- |
| (1) | 1-amino-3-chlorobenzene | 1-hydroxy-3,5-diphenylaminobenzene | Yellow-brown. |
| (2) | 1-amino-2-chloro-4-nitrobenzene | ----do---- | Brown. |
| (3) | 1-amino-2-methoxy-4-nitrobenzene | ----do---- | Red-brown. |
| (4) | 1-amino-2-methoxy-5-(diethylamino-sulfonyl)-benzene | ----do---- | Yellow-brown. |
| (5) | 1-amino-2,5-dichlorobenzene | 1-hydroxy-3,5-di-(4'-methoxyphenylamino)-benzene | Do. |
| (6) | 1-amino-2-chloro-4-nitrobenzene | ----do---- | Red brown. |
| (7) | 1-amino-2-methoxy-5-chlorobenzene | ----do---- | Orange-brown. |
| (8) | 1-amino-2-methoxy-4-nitrobenzene | ----do---- | Red-brown. |
| (9) | 1-amino-2,5-dichlorobenzene | 1-hydroxy-3,5-di-(4'-ethoxy-phenylamino)-benzene | Brown. |
| (10) | 1-amino-2-methoxy-5-chlorobenzene | ----do---- | Reddish-brown. |
| (11) | 4-amino-4'-methoxy-diphenylamine | ----do---- | Violet-brown. |
| (12) | 1-amino-2-methoxy-5-chlorobenzene | 1-hydroxy-3,5-di-(2',4'-dimethyl-phenylamino)-benzene | Orange-brown. |
| (13) | 1-amino-2-chloro-4-nitrobenzene | ----do---- | Red-brown. |
| (14) | 1-amino-2,5-dichlorobenzene | 1-hydroxy-3,5-di-(4'-phenoxy-phenylamino)-benzene | Yellow-brown. |
| (15) | 4-amino-3,2'-dimethyl-azobenzene | ----do---- | Red-brown. |
| (16) | 1-amino-2,5-dichloro-benzene | 1-hydroxy-3,5-di-(4'-chloro-phenylamino)-benzene | Yellow-brown. |
| (17) | 1-amino-2-chloro-4-nitrobenzene | ----do---- | Reddish dark brown. |
| (18) | 1-amino-2-methoxy-5-chlorobenzene | ----do---- | Brown. |
| (19) | 1-amino-2-phenoxy-5-chlorobenzene | ----do---- | Yellow-brown. |
| (20) | 1-amino-2-(4'-chlorophenoxy)-5-chlorobenzene | ----do---- | Brown. |
| (21) | 1-amino-2,4,5-trichlorobenzene | ----do---- | Yellowish-brown. |
| (22) | 1-amino-anthraquinone | ----do---- | Red-brown. |
| (23) | 4-amino-3,2'-dimethylazobenzene | ----do---- | Dark red-brown. |
| (24) | 4-amino-4'-methoxy-diphenylamine | ----do---- | Dark violet-brown. |
| (25) | 4,4'-diamino-3,3'-dichloro-diphenyl | ----do---- | Dark red-brown. |
| (26) | 2-amino-1,6-dibromonaphthalene | ----do---- | Reddish-brown. |
| (27) | 1-amino-2-chloro-4-nitrobenzene | 1-hydroxy-3,5-di-(3',4'-dichloro-phenylamino)-benzene | Brown. |
| (28) | 1-amino-2-methoxy-4-nitrobenzene | ----do---- | Do. |
| (29) | 4-amino-3,2'-dimethylazobenzene | ----do---- | Dark red-brown. |
| (30) | 1-amino-2,5-dichlorobenzene | 1-hydroxy-3,5-di-(3'-methyl-phenylamino)-benzene | Yellow-brown. |
| (31) | 1-amino-2-methoxy-4-nitrobenzene | ----do---- | Red-brown |
| (32) | 1-amino-2-methoxy-5-chlorobenzene | 1-hydroxy-3,5-di-(2'-methyl-4'-chloro-phenylamino)-benzene | Yellow-brown. |
| (33) | 1-amino-2-chloro-4-nitrobenzene | ----do---- | Red-brown. |
| (34) | 1-amino-2-(2',5'-dichloro-phenoxy)-5-chlorobenzene | ----do---- | Yellow-brown. |
| (35) | 1-amino-2-chloro-5-trifluoromethyl-benzene | ----do---- | Do. |
| (36) | 1-amino-4-benzoylamino-2,5-diethoxy-benzene | ----do---- | Currant-brown. |
| (37) | 4-amino-4'-methoxy-diphenylamine | ----do---- | Do. |
| (38) | 1-amino-2,5-dichlorobenzene | 1-hydroxy-3,5-di-(2'-methoxy-4'-chloro-phenylamino) benzene | Brown. |
| (39) | 1-amino-2-chloro-4-nitrobenzene | ----do---- | Red-brown. |
| (40) | 1-amino-2-phenoxy-5-chlorobenzene | ----do---- | Brown. |

| | Diazo compound of— | Combined with— | Shade |
|---|---|---|---|
| (41) | 1-amino-2-(4'-chlorophenoxy)-5-chloro-benzene | 1-hydroxy-3,5-di-(4'-acetylamino-phenylamino)-benzene. | Yellow-brown. |
| (42) | 1-amino-3-benzoyl-benzene | ___do___ | Do. |
| (43) | 1-amino-2,4,5-trichlorobenzene | ___do___ | Yellowish brown. |
| (44) | 1-amino-2-methyl-5-(carbonyl-[1'-amino-2',5'-dimethoxy-benzene])-benzene. | ___do___ | Yellow-brown. |
| (45) | 3-aminocarbazole | ___do___ | Dark violet-brown. |
| (46) | 4-amino-3,2'-dimethylazobenzene | 1-hydroxy-3,5-di-(naphthyl-2'-amino)-benzene | Reddish brown. |
| (47) | 4,4'-diamino-3,3'-dimethoxy-diphenyl | ___do___ | Brown-violet. |
| (48) | 1-hydroxy-4-benzoylamino-2,5-dichlorobenzene | 1-hydroxy-3,5-di-(quinolyl-6'-amino)-benzene | Dark red-brown. |
| (49) | 1-amino-3-methyl-2,4-dichlorobenzene | ___do___ | Red-brown. |
| (50) | 1-amino-2-phenylsulfonyl-benzene | ___do___ | Do. |
| (51) | 1-amino-2-(2',5'-dichloro-phenoxy)-5-chlorobenzene | ___do___ | Do. |
| (52) | 1-amino-2,5-dichlorobenzene | 1-hydroxy-3,5-di-(4'-chloro-3'-nitro-phenylamino)-benzene. | Yellow-brown. |
| (53) | 1-amino-2-chloro-4-nitrobenzene | ___do___ | Red-brown. |
| (54) | 1-amino-2-methoxy-5-chlorobenzene | 1-hydroxy-3,5-di-(4'-[4''-methoxy-phenylamino]-phenylamino)-benzene. | Orange-brown. |
| (55) | 4-amino-3,2'-dimethyl-azobenzene | ___do___ | Red-brown. |
| (56) | 1-amino-2-(4'-chlorophenoxy)-5-chlorobenzene | ___do___ | Yellowish brown. |
| (57) | 4-amino-4'-methoxy-diphenylamine | ___do___ | Dark red-brown. |
| (58) | 1-amino-2,5-dichlorobenzene | 1-hydroxy-3,5-di-(3'-methoxynaphthyl-2'-amino)-benzene. | Yellow-brown. |
| (59) | 1-amino-2-phenoxy-5-chlorobenzene | ___do___ | Reddish brown. |
| (60) | 1-amino-2-chloro-4-nitrobenzene | ___do___ | Red-brown. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We wish it to be understood that in the following claims the term "combining" means everywhere combining in substance or on a substratum, especially on the fiber, and that the term "diazo compounds" comprises all diazotized aromatic amino compounds including such as contain already a diazo or azo group.

What is claimed is,

1. The water-insoluble azo dyestuffs containing 1-hydroxy-3,5-diarylamino-benzenes of the general formula:

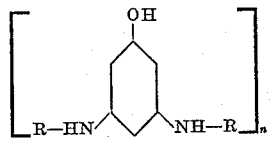

wherein R means a radical of the benzene, naphthalene or quinoline series and $n$ means the number 1 or 2, the benzene nucleus bearing the hydroxy group being attached by means of azo groups to a radical of the benzene, naphthalene, diphenyl, anthraquinone or carbazole series, which dyestuffs are obtainable by combining diazo compounds of the benzene, naphthalene, diphenyl, anthraquinone or carbazole series with 1-hydroxy-3,5-diarylamino-benzenes of the above formula, yielding when produced on the fiber, dyeings the shades of which vary from Bordeaux to brown to black.

2. The water-insoluble azo dyestuffs of the general formula:

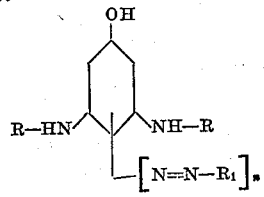

wherein R means a radical of the benzene, naphthalene or quinoline series, $R_1$ stands for a radical of the benzene, naphthalene, diphenyl, anthraquinone or carbazole series and $n$ means the number 1 or 2, yielding, when produced on the fiber, dyeings the shades of which vary from Bordeaux to brown to black.

3. The water-insoluble azo dyestuffs of the general formula:

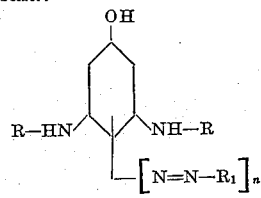

wherein R means a radical of the benzene series, $R_1$ stands for a radical of the benzene, naphthalene, diphenyl, anthraquinone or carbazole series and $n$ means the number 1 or 2, yielding, when produced on the fiber, dyeings the shades of which vary from Bordeaux to brown to black.

4. The water-insoluble azo dyestuffs of the general formula:

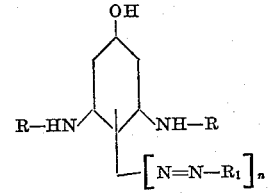

wherein R and $R_1$ mean radicals of the benzene series and $n$ means the number 1 or 2, yielding, when produced on the fiber, dyeings the shades of which vary from Bordeaux to brown to black.

5. The water-insoluble azo dyestuff of the formula:

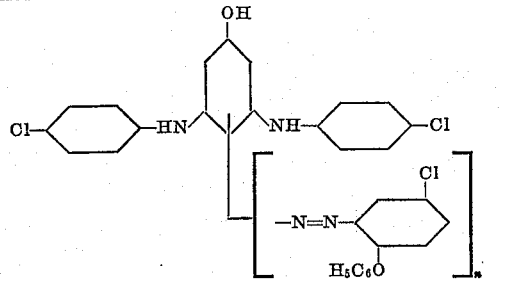

wherein $n$ means the number 1 or 2, yielding, when produced on the fiber, a yellowish-brown dyeing of good fastness properties.

6. The water-insoluble azo dyestuff of the formula:

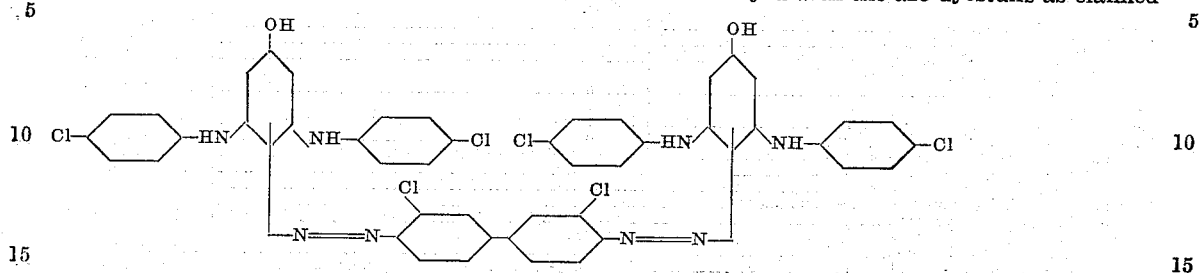

yielding, when produced on the fiber, a dark red-brown dyeing of good fastness properties.

7. The water-insoluble azo dyestuff of the formula:

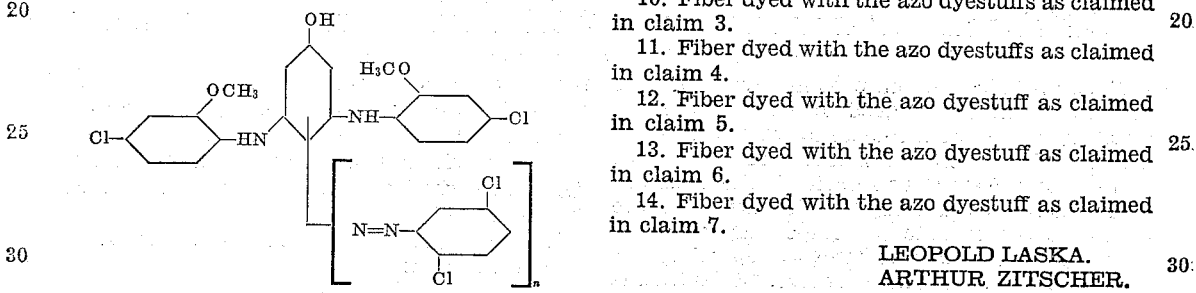

wherein $n$ means the number 1 or 2, yielding, when produced on the fiber, a brown dyeing of good fastness properties.

8. Fiber dyed with the azo dyestuffs as claimed in claim 1.

9. Fiber dyed with the azo dyestuffs as claimed in claim 2.

10. Fiber dyed with the azo dyestuffs as claimed in claim 3.

11. Fiber dyed with the azo dyestuffs as claimed in claim 4.

12. Fiber dyed with the azo dyestuff as claimed in claim 5.

13. Fiber dyed with the azo dyestuff as claimed in claim 6.

14. Fiber dyed with the azo dyestuff as claimed in claim 7.

LEOPOLD LASKA.
ARTHUR ZITSCHER.